United States Patent
Put et al.

(10) Patent No.: US 10,483,529 B2
(45) Date of Patent: Nov. 19, 2019

(54) COMPOSITE POWDER FOR USE IN AN ANODE OF A LITHIUM ION BATTERY, METHOD OF PREPARING SUCH A COMPOSITE POWDER AND METHOD FOR ANALYSING SUCH A COMPOSITE POWDER

(71) Applicants: Umicore, Brussels (BE); Showa Denko K.K., Tokyo (JP)

(72) Inventors: Stijn Put, Olmen (BE); Dirk Van Genechten, Koersel (BE); Kris Driesen, Hasselt (BE); Jin Hu, Antwerp (BE); Yvan Strauven, Neerpelt (BE); Arihiro Muto, Kanagawa (JP); Nobuaki Ishii, Kanagawa (JP); Masataka Takeuchi, Kanagawa (JP)

(73) Assignees: UMICORE, Brussels (BE); SHOWA DENKO K.K., Tokyo (JP)

( * ) Notice: Subject to any disclaimer, the term of this patent is extended or adjusted under 35 U.S.C. 154(b) by 35 days.

(21) Appl. No.: 15/538,706

(22) PCT Filed: Dec. 11, 2015

(86) PCT No.: PCT/EP2015/079388
§ 371 (c)(1),
(2) Date: Jun. 22, 2017

(87) PCT Pub. No.: WO2016/102208
PCT Pub. Date: Jun. 30, 2016

(65) Prior Publication Data
US 2017/0352877 A1 Dec. 7, 2017

(30) Foreign Application Priority Data
Dec. 23, 2014 (EP) .................................. 14200041

(51) Int. Cl.
H01M 4/36 (2006.01)
H01M 4/38 (2006.01)
H01M 4/62 (2006.01)
H01M 10/0525 (2010.01)
H01M 10/04 (2006.01)

(52) U.S. Cl.
CPC .......... *H01M 4/364* (2013.01); *H01M 4/386* (2013.01); *H01M 4/625* (2013.01); *H01M 10/0413* (2013.01); *H01M 10/0525* (2013.01)

(58) Field of Classification Search
CPC ...... H01M 4/364; H01M 4/386; H01M 4/698; H01M 10/0413; H01M 10/0525
See application file for complete search history.

(56) References Cited

U.S. PATENT DOCUMENTS

| | | | |
|---|---|---|---|
| 6,589,696 B2 | 7/2003 | Matsubara et al. | |
| 8,062,556 B2 | 11/2011 | Peres et al. | |
| 8,124,279 B2 | 2/2012 | Petrat et al. | |
| 8,158,282 B2 | 4/2012 | Zhamu et al. | |
| 8,241,793 B2 | 8/2012 | Zhamu et al. | |
| 2005/0074672 A1* | 4/2005 | Matsubara | H01M 4/0421 429/231.95 |
| 2005/0136330 A1 | 6/2005 | Mao | |
| 2006/0134516 A1 | 6/2006 | Im et al. | |
| 2009/0269677 A1 | 10/2009 | Hirose | |
| 2010/0075227 A1 | 3/2010 | Morita | |
| 2013/0115517 A1 | 5/2013 | Kim | |
| 2013/0295446 A1* | 11/2013 | Murata | H01M 4/134 429/188 |
| 2013/0337314 A1 | 12/2013 | Essaki | |
| 2014/0038042 A1* | 2/2014 | Rios | H01M 4/362 429/211 |
| 2014/0234722 A1 | 8/2014 | Kyotani | |
| 2014/0255785 A1 | 9/2014 | Do | |
| 2014/0287315 A1 | 9/2014 | Troegel | |

FOREIGN PATENT DOCUMENTS

| | | |
|---|---|---|
| CN | 103091200 | * 5/2013 |
| CN | 103091200 A | 5/2013 |
| CN | 103964438 A | 8/2014 |
| EP | 0573266 A1 | 12/1993 |
| EP | 1722429 A2 | 11/2006 |
| JP | 2002-298842 | 10/2002 |
| WO | 20140172914 A1 | 10/2014 |
| WO | 2015/117838 A1 | 8/2015 |

OTHER PUBLICATIONS

English translation of CN Publication 103091200, May 2013.*
Taiwanese Search Report for Application No. 104142740.
International Search Report for PCT/EP2015/079388, dated Mar. 7, 2016.
Taiwan Intellectual Property Office; Office Action for Taiwanese Application No. 104142742 dated Sep. 30, 2016.
Hongfa, X. et al., "Graphene/nanosized Silicon Composites for Lithium Battery Anodes with Improved Cycling Stability", Carbon, vol. 49, Jan. 1, 2011, pp. 1787-1769.
Kuksenko, S.P., "Silicon-Containing Anodes with High Capacity Loading for Lithium-Ion Batteries," Russian journal of Electrochemistry, vol. 50, No. 6, Jun. 1, 2014, pp. 537-547.
ISA/EP; International Search Report and Written Opinion for PCT/EP2015/073879, dated Jan. 12, 2016.

(Continued)

*Primary Examiner* — Brittany L Raymond
(74) *Attorney, Agent, or Firm* — NK Patent Law

(57) ABSTRACT

Composite powder for use in an anode of a lithium ion battery, whereby the particles of the composite powder comprise silicon-based domains in a matrix, whereby the individual silicon-based domains are either free silicon-based domains that are not or not completely embedded in the matrix or are fully embedded silicon-based domains that are completely surrounded by the matrix, whereby the percentage of free silicon-based domains is lower than or equal to 4 weight % of the total amount of Si in metallic or oxidized state in the composite powder.

11 Claims, No Drawings

(56) References Cited

OTHER PUBLICATIONS

USPTO; Non-Final Office Action for U.S. Appl. No. 15/538,698 dated Sep. 19, 2018.
ISA/EP; International Search Report and Written Opinion for PCT/EP2015/073880, dated Jan. 5, 2016.
USPTO; Non-Final Office Action for U.S. Appl. No. 15/538,292 dated Sep. 14, 2018.

* cited by examiner

COMPOSITE POWDER FOR USE IN AN ANODE OF A LITHIUM ION BATTERY, METHOD OF PREPARING SUCH A COMPOSITE POWDER AND METHOD FOR ANALYSING SUCH A COMPOSITE POWDER

This application is a National Stage application of International Application No. PCT/EP2015/079388, filed Dec. 11, 2015. This application also claims priority under 35 U.S.C. § 119 to European Application No. 14200041.3, filed Dec. 23, 2014.

The present invention relates to a composite powder for use in an anode of a lithium ion battery, a method of preparing such a composite powder and a method for analysing such a composite powder.

BACKGROUND

Lithium ion (Li-ion) batteries are currently the best performing batteries and already became the standard for portable electronic devices. In addition, these batteries already penetrated and rapidly gain ground in other industries such as automotive and electrical storage. Enabling advantages of such batteries are a high energy density combined with a good power performance.

A Li-ion battery typically contains a number of so-called Li-ion cells, which in turn contain a positive (cathode) electrode, a negative (anode) electrode and a separator which are immersed in an electrolyte. The most frequently used Li-ion cells for portable applications are developed using electrochemically active materials such as lithium cobalt oxide or lithium nickel manganese cobalt oxide for the cathode and a natural or artificial graphite for the anode.

It is known that one of the important limitative factors influencing batteries' performance and in particular batteries' energy density is the active material in the anode. Therefore, to improve the energy density, newer electrochemically active materials based on e.g. tin, aluminium and silicon were investigated and developed during the last decades, such developments being mostly based on the principle of alloying said active material with Li during Li incorporation therein during use.

The best candidate seems to be silicon as theoretical capacities of 4200 mAh/g (gravimetric) or 2200 mAh/cm$^3$ (volumetric) can be obtained and these capacities are far larger than that of graphite (372 mAh/g) but also those of other candidates.

Note that throughout this document silicon is intended to mean the element Si in its zerovalent state. The term Si will be used to indicate the element Si regardless of its oxidation state, zerovalent or oxidised.

However, one drawback of using a silicon based electrochemically active material in an anode is its large volume expansion during charging, which is as high as 300% when the lithium ions are fully incorporated, e.g. by alloying or insertion, in the anode's active material—a process often called lithiation. The large volume expansion of the silicon based materials during Li incorporation may induce stresses in the silicon, which in turn could lead to a mechanical degradation of the silicon material.

Repeated periodically during charging and discharging of the Li-ion battery, the repetitive mechanical degradation of the silicon electrochemically active material may reduce the life of a battery to an unacceptable level.

In an attempt to alleviate the deleterious effects of the volume change of the silicon, many research studies showed that by reducing the size of the silicon material into submicron or nano-sized Si domains, typically with an average size smaller than 500 nm and preferably smaller than 150 nm, and using these as the electrochemically active material may prove a viable solution.

In order to accommodate the volume change, the silicon domains are usually used as composite particles in which the silicon domains are mixed with a matrix material, usually a carbon based material, but possibly also a Si-based alloy or $SiO_2$.

Further, a negative effect of silicon is that a thick SEI, a Solid-Electrolyte Interface, may be formed on the anode. An SEI is a complex reaction product of the electrolyte and lithium, and therefore leads to a loss of lithium availability for electrochemical reactions and therefore to a poor cycle performance, which is the capacity loss per charging-discharging cycle. A thick SEI may further increase the electrical resistance of a battery and thereby limit the achievable charging and discharging rates.

It is known from U.S. Pat. No. 6,589,696 and US 2006/0134516 that in theory reactions between an active anode material and the electrolyte may be avoided by putting a coating material on the active particles of the anode material.

In practice this was attempted in these documents by mixing particles of the anode material with a polyvinyl alcohol (PVA) solution, evaporating the solvent and pyrolising the obtained product to decompose the PVA to carbon.

This will only give, at best, a partial and defective coating however, offering insignificant shielding of the anode material from the electrolyte.

The reasons for this are probably related to one or more of the following factors:

The amounts of PVA were too low to form a complete coating.

In the disclosed process a significant proportion of the PVA will end up some distance from the active anode material and is not available to form a coating.

The carbon yield of PVA decomposition is only 10-20%, so that very significant shrinkage of a carbon layer during its formation will occur, leading to cracks of the carbon layer while it is being formed and to uncoated areas.

Escaping decomposition gasses, 80-90% by weight, will create channels for themselves in the decomposing PVA layer during conversion to carbon, creating porosities in the carbon layer thereby reducing its protective capabilities.

In addition, it is suspected that the oxygen molecules in PVA will, during thermal decomposition, react with silicon to form $SiO_2$, thereby rendering at least part of the silicon inert for electrochemical applications.

Despite the advances in the art of negative electrodes and electrochemically active materials contained therein, there is still a need for yet better electrodes that have the ability to further optimize the performance of Li-ion batteries. In particular, for most applications, negative electrodes having improved capacities and coulombic efficiencies are desirable.

In order to reduce the abovementioned and other problems, the invention concerns a composite powder for use in an anode of a lithium ion battery, whereby the particles of the composite powder comprise silicon-based domains in a matrix, whereby the matrix is carbon or a precursor material that can be converted into carbon by thermal treatment, whereby the individual silicon-based domains are either free silicon-based domains that are not or not completely embedded in the matrix or are fully embedded silicon-based domains that are completely surrounded by the matrix, whereby the percentage of free silicon-based domains is lower than or equal to 4 weight % of the total amount of Si in metallic or oxidized state in the composite powder whereby the silicon-based domains have a weight based size distribution with a $d_{50}$ of 200 nm or less and a $d_{90}$ of 1000 nm or less.

Free silicon-based domains are hereby defined as those silicon-based domains that are not or not completely shielded by the matrix material and are therefore freely accessible from outside the composite particle.

By a silicon-based domain is meant a cluster of mainly silicon having a discrete boundary with the matrix. The silicon content in such a silicon-based domain is usually 80 weight % or more, and preferably 90 weight % or more.

In practice, such a silicon-based domain can be either a cluster of mainly silicon atoms in a matrix made from different material or a discrete silicon particle. A plurality of such silicon particles is a silicon powder.

The composite powder is in other words a carbon-based composite, in which a separately produced silicon nano powder is agglomerated with separately produced carbon and/or a carbon precursor acting as the matrix. In this case the silicon-based domains are formed by the actual discrete silicon particles from the silicon nano powder.

The silicon-based domains may have a thin surface layer of silicon oxide.

Such a composite powder according to the invention will have a strongly reduced tendency for SEI formation compared to traditional composite powders with silicon-based domains, and therefore will have a better cycle performance and will be more apt to be used with high currents.

Without being bound by theory the inventors speculate that this is related to a lower possible contact surface between the electrolyte and the silicon-based domains than in traditional powders, even though Si is usually not a significant component in SEIs.

A further advantage is that less stringent requirements can be put on the water content of the electrolyte. This is because of the following reason: water in the electrolyte can react with $LiPF_6$ in the electrolyte to form HF. This HF can corrode the silicon, leading to a silicon loss and to the formation of $Li_2SiF_6$ which reduces the electrical conductivity of the electrolyte. To avoid this, the water content in the electrolyte is kept extremely low, often 50 ppm or less. However, expensive raw materials and/or expensive processing facilities are needed to obtain this.

With the low level of free silicon of the powder of the invention, this problem is much reduced, so that the stringent water limitation requirements of the electrolyte can be relaxed and overall cost reduced.

Preferably the percentage of free silicon-based domains is lower than 3 weight % and preferably lower than 2 weight %, and more preferably lower than 1 weight % of the total amount of Si in metallic or oxidised state in the composite powder, so that the advantages are obtained to a higher degree.

In a preferred embodiment the matrix is pitch or thermally decomposed pitch.

Such a product has been shown to give good performance in a battery.

Preferably the composite powder contains less than 3 weight %, more preferably less than 2 weight % and most preferably less than 1% of oxygen.

The silicon-based domains may have any shape, e.g. substantially spherical but also whiskers, rods, plates, fibers and needles, etc.

In a preferred embodiment the percentage of free silicon-based domains is the percentage as determined by placing a sample of the composite powder in an alkaline solution for a specified time, determining the volume of hydrogen that has evolved after the specified time, calculating the amount of silicon needed for evolving this amount of hydrogen based on a production of two moles of hydrogen for every mole of silicon reacted and dividing this by the total amount of Si in metallic or oxidised state present in the sample.

Such a calculation can simply be done by the skilled person based on the well-known ideal gas law.

The specified time is optimally the time that is needed to fully complete a reaction of nano silicon powder, which is not part of a composite, in the alkaline solution, but not longer. This will of course depend on the temperature chosen and the concentration of the alkaline solution. By choosing these conditions, all free silicon is measured, but fully embedded silicon is not measured incorrectly, which might happen if a longer period or more severe conditions are chosen, due to diffusion/penetration of the alkaline solution through the matrix.

An example of a specified time is 48 hrs, at a temperature of 45° C. and using a 1.2 g/l KOH solution. It was determined that these conditions are sufficient for completion of the reaction of pure silicon nano powder, but not longer than needed.

For measuring a gas amount various easy methods are available. A particularly practical method is to use a gas burette.

The total amount of Si in metallic or oxidised state is in many cases known from the amount of Si-containing material used to prepare the composite, or can alternatively be determined by a standard chemical analysis.

In a preferred embodiment the silicon-based domains are silicon-based particles, meaning that they were, before forming the composite, individually identifiable particles that existed separately from the matrix, since they were not formed together with the matrix.

In another preferred embodiment the silicon-based particles are preferably free from other elements than Si and O, so consist of silicon and oxidised Si, not taking inevitable impurities into account.

In a further preferred embodiment the silicon-based domains have a weight based size distribution with a $d_{50}$ of 200 nm or less and a $d_{90}$ of 1000 nm or less.

In a further preferred embodiment the ratio $d_{90}/d_{50}$ is lower than 10, and more preferably lower than 7.

The $d_{50}$ value is defined as the size of a silicon-based domain corresponding to 50 weight % cumulative undersize domain size distribution. In other words, if for example the silicon-based domain size $d_{50}$ is 93 nm, 50% of the total weight of domains in the tested sample are smaller than 93 nm. Analogously $d_{90}$ is the domain size compared to which 90% of the total weight of domains is smaller.

In the case that the silicon-based domains are or were individual loose particles, such size distribution may be simply determined by laser diffraction of these particles. As is well known to the skilled person, particular care has to be taken to de-agglomerate agglomerates in order to reliably determine the particle size.

Aggregates of silicon-based domains may be formed during their synthesis. In the context of this invention, an aggregate is to be understood as a group of domains which are coalesced together in a structure with such an intergrowth degree that said structure can be divided into the individual domains only partially, if at all.

The degree of intergrowth of the aggregates can be influenced by the parameters of the synthesis process of forming said domains which may, for example during their formation, coalesce and grow subsequently together to form the aggregates. Thus a characteristic of an aggregate may be that when attempting to divide it into individual constituent domains, destruction of some or all of the domains will occur.

For simplicity, the definition of domains in accordance with the present invention also includes aggregates of domains which are fused together so that they may not be separated without risk of destruction of the domains.

The domains may also agglomerate due to Van der Waals forces and other electromagnetic forces acting between them to form agglomerates. In contrast to the aggregates, agglomerates are understood in the context of this invention as meaning only a loose association of domains which can readily disintegrate into the constituent domains and are not considered as domains in their own right.

Alternatively, such a size distribution may be determined optically from SEM and/or TEM images by measuring at least 200 silicon-based domains. This method is appropriate if the silicon-based domains are present in a matrix from which they cannot be separated, but may also be used for a silicon based powder. It should be noted that by domain is meant the smallest discrete domain that can be determined optically from SEM or TEM images. The size of a silicon based domain is then determined as the largest measurable line distance between two points on the periphery of the domain.

Such an optical method will give a number-based domain size distribution, which can be readily converted to a weight based size distribution via well-known mathematical equations.

The invention further concerns a method for preparing composite powder whereby the particles of the composite powder comprise silicon-based domains in a matrix comprising a mixing step in which silicon-based particles, preferably nano silicon powder are mixed with matrix material in the molten state, preferably without additional solvent, followed by a size reduction step of the obtained mixture and/or of the product obtained by thermally treating the obtained mixture.

Preferably the matrix material in the molten state is molten pitch.

Preferably the mixing step is entirely done with the matrix in the molten state.

Preferably the mixing step is performed in an extruder.

This method allows to produce easily a good composite powder for use in anodes, presumably due to the fact that the matrix materials will cover the entire surface of the silicon-based domains.

In a specific variant the method is a method for preparing a composite powder according to the invention as defined above.

Both in the composite powder according to the invention as well as the method according to the invention the matrix is preferably lithium-ion conducting and electron conducting or is made from a precursor material that can be made lithium-ion conducting and electron conducting by thermal decomposition.

The invention further concerns a method for determining, on a composite powder having particles of composite powder comprising silicon-based domains in a matrix, the weight percentage of silicon-based domains that are not fully embedded in the matrix, comprising the following steps in order:
A: placing an amount of the composite powder in an alkaline solution for a specified time;
B: determining the volume of hydrogen that has evolved after the specified time;
C: calculating the amount of silicon needed for evolving this amount of hydrogen based on a production of two moles of hydrogen for every mole of silicon reacted and dividing this by the total amount of Si in metallic or oxidised state present in the sample.

The invention further concerns the use of a composite powder according to the invention in a lithium ion battery for limiting or avoiding SEI formation.

The manufacture and characterisation of a powder according to the invention is described in the following examples and counter examples.

Analytical Methods

Determination of Free Silicon

In order to determine the percentage of free silicon-based domains of a product, 0.1 g of the product, having a known total Si content, was placed in a solution of 1.2 g/l KOH in water, at 45° C. A gas burette was used to collect and measure the volume of gas evolved over a 48 hr period, although other gas measurement methods may be envisaged.

A reference test containing only the KOH solution was also performed at same temperature.

The volume of gas evolved in the reference test, presumably due to release of absorbed gasses from air, was subtracted from the volume of gas evolved from the tested product.

The volume of gas thus calculated was converted to a mass of reacted silicon based on the ideal gas law and the knowledge that the reaction of silicon with KOH will proceed according to one or both of the following reactions, which both give an equivalence of 2 moles of hydrogen per mole of silicon:

$$Si+KOH+5H_2O \rightarrow KH_7SiO_6+2H_2$$

$$Si+2KOH+2H_2O \rightarrow K_2H_2SiO_4+2H_2$$

The percentage of free silicon-based domains was defined as the ratio of the amount of reacted silicon and the total amount of Si in the sample.

Determination of Oxygen Content

The oxygen contents of the powders in the examples and the counterexamples were determined by the following method, using a Leco TC600 oxygen-nitrogen analyzer.

A sample of the powder was put in a closed tin capsule that was put itself in a nickel basket. The basket was put in a graphite crucible and heated under helium as carrier gas to above 2000° C.

The sample thereby melts and oxygen reacts with the graphite from the crucible to CO or $CO_2$ gas. These gases are guided into an infrared measuring cell. The observed signal is recalculated to an oxygen content.

Determination of Electrochemical Performance

All composite powders to be tested were sieved using a 45 μm sieve and mixed with carbon black, carbon fibres and sodium carboxymethyl cellulose binder in water (2.5 wt %). The ratio used was 90 weight parts composite powder/3 weight parts carbon black/2 weight parts carbon fibres and 5 weight parts carboxymethyl cellulose (CMC).

These components were mixed in a Pulverisette 7 planetary ball mill in two stages of 10 minutes at 500 rpm.

A copper foil cleaned with ethanol was used as current collector. A 125 μm thick layer of the mixed components was coated on the copper foil. The coating was dried for 45 minutes in vacuum at 50° C. A 1.27 cm$^2$ circle was punched from the dried coated copper foil and used as an electrode in a coin cell using lithium metal as counter electrode. The electrolyte was 1M LiPF$_6$ dissolved in EC/DEC 1/1+2% VC+10% FEC solvents. All samples were tested in a coin-cell tester with high precision (Maccor 4000 series).

The coulombic efficiency of repeated charging and discharging cycles was determined. The coulombic efficiency of the 9$^{th}$ cycle is reported, as this is representative for the average between the 5$^{th}$ and the 100$^{th}$ cycle.

The skilled person will be aware that a small change in coulombic efficiency per cycle, will have, over the hundreds or thousands of charging-discharging cycles a battery is expected last, a significant cumulative effect.

Determination of the Silicon-Based Domain Size Distribution

Particle size distributions were determined, for the silicon powders in example 1 and the counterexamples, by the following method.

0.5 g of Si powder and 99.50 g of demineralised water were mixed and dispersed by means of an ultrasound probe for 2 min @225 W.

The size distributions were determined on a Malvern Mastersizer 2000, using ultrasound during the measurement, using a refractive index for Si of 3.5 and an absorption coefficient of 0.1 and ensuring that the detection threshold was between 5 and 15%.

Starting Material for the Examples and Counter Examples

A nano silicon powder was prepared as follows:

A micron-sized silicon powder was provided as precursor. A 60 kW radio frequency (RF) inductively coupled plasma (ICP) was applied, using an argon plasma. The precursor was injected in the plasma at a rate of 220 g/h, resulting in a prevalent (i.e. in the reaction zone) temperature above 2000K.

In this first process step the precursor became totally vaporized followed by a nucleation into nano silicon powder. An argon flow was used as quench gas immediately downstream of the reaction zone in order to lower the temperature of the gas below 1600K. In this way the metal nuclei were formed. Finally, a passivation step was performed at a temperature of 100° C. during 5 minutes by adding 100 l/h of a N$_2$/O$_2$ mixture containing 0.15 mole % oxygen.

The argon gas flowrate for both the plasma and for the quench gas was adjusted to obtain nano silicon powder having particles with a d$_{50}$ of 80 nm and a d$_{90}$ of 521 nm. In the present case 2.5 Nm$^3$/h Ar was used for the plasma and 10 Nm$^3$/h Ar was used as quench gas.

Example 1

A blend was made of 8 g of the mentioned nano silicon powder and 27 g petroleum based pitch powder. This was heated to 450° C. under N$_2$, so that the pitch melted, and, after a waiting period of 60 minutes, mixed for 30 minutes by means of a dispersion disk.

The suspension of nano silicon in pitch thus obtained was cooled under N$_2$ to room temperature and milled.

4.4 g of the milled mixture was mixed with 7 g graphite for 3 hrs on a roller bench, after which the obtained mixture was passed through a mill to de-agglomerate it.

A thermal aftertreatment was given to the powder as follows: The powder was put in a quartz crucible in a tube furnace, heated up at a heating rate of 3° C./min to 1000° C. and kept at such temperature for two hours and then cooled. All this was performed under argon atmosphere.

The fired product was pulverized to form a composite powder and sieved on a 400 mesh sieve.

Example 2

A blend was made of 500 g of the mentioned nano silicon powder and 600 g petroleum based pitch powder.

The blend was fed into a Haake process 11 extruder, which is equipped with a twin screw, and which was heated to 400° C., with the screw running at a rotating speed of 150 rpm. The residence time in the extruder was 30 minutes.

The obtained extrudate was cooled down to less than 50° C. The obtained extrudate visually appeared to be a homogeneous nano silicon/pitch composite.

The injection port of the extruder and the glass container in which the extrudate was collected were separated from ambient air by flushing with N$_2$.

The cooled extrudate was mixed with graphite powder in a weight ratio 22:84, and milled for 2 hrs on a roller bench, after which the obtained mixture was passed through a mill to de-agglomerate it.

A thermal aftertreatment, pulverisation and sieving were performed as for example 1.

Counterexample 1

A blend was made of 1 g of the mentioned nano silicon powder and 3.37 g pitch and 7 g graphite and was mixed for 3 hrs on a roller bench, after which the obtained mixture was passed through a mill to de-agglomerate it.

The previous steps were performed at room temperature so that the pitch did not melt.

A thermal aftertreatment, pulverisation and sieving were performed as for example 1.

Counterexample 2

A blend was made of 1 g of the mentioned nano silicon powder and 3.37 g pitch and 7 g graphite. To this blend 10 ml of THF were added and this was mixed for 16 hrs on a roller bench.

This was performed at room temperature so that the pitch did not melt.

The mixture was dried in a rotavap at 75° C. and 30 mBar pressure, after which the obtained mixture was passed through a mill to de-agglomerate it.

A thermal aftertreatment, pulverisation and sieving were performed as for example 1.

Counterexample 3

The same procedure as in counterexample 2 was followed, with the exception that the drying step of the mixture in the rotavap was replaced by a spray drying step with nitrogen as drying gas using an exhaust temperature of 110° C.

Results

The total Si content of the products from example 1 and the counter examples was measured as 9.5+/−0.5% by chemical analysis.

The total Si content of the products from example 2 was measured as 10+/−0.5% by chemical analysis.

The free silicon content, oxygen content and electrochemical performance of all products were measured as explained above. The results are reported in table 1.

TABLE 1

| Product | Coulombic efficiency of cycle 9 (%) | Free silicon (%) | Oxygen (%) |
|---|---|---|---|
| Example 1 | 99.46 | <0.3 | 0.5 |
| Example 2 | 99.49 | <0.3 | 0.7 |
| Counter example 1 | 99.32 | 4.2 | 0.9 |
| Counter example 2 | 99.36 | 4.9 | 1.4 |
| Counter example 3 | 99.22 | 7.0 | 1.5 |

It should be noted that in the particular measurement conditions 0.3% free silicon was the detection limit. This detection limit can be reduced by the skilled person by increasing the sample size and/or by reducing the measurement limit of the evolved gas.

It can be seen that the products with low measured free silicon contents give a much better coulombic efficiency, leading to a better cycle performance of a battery using such powder as anode.

The invention claimed is:

1. A composite powder for use in an anode of a lithium ion battery, wherein particles of the composite powder comprise silicon-based domains in a matrix, and wherein the matrix comprises carbon or a precursor material that can be converted into carbon by thermal treatment, and wherein the individual silicon-based domains are either:

free silicon-based domains that are not or not completely embedded in the matrix, or fully embedded silicon-based domains that are completely surrounded by the matrix, wherein the percentage of free silicon-based domains is lower than or equal to 4 weight % of the total amount of Si in metallic or oxidized state in the composite powder, and wherein the silicon-based domains have a weight based size distribution with a $d_{50}$ of 200 nm or less and a $d_{90}$ of 1000 nm or less, and wherein the composite powder also comprises graphite, wherein the graphite is not embedded in the matrix.

2. The composite powder according to claim 1, wherein the percentage of free silicon-based domains is lower than 3 weight % of the total amount of Si in metallic or oxidised state in the composite powder.

3. The composite powder according to claim 1, wherein the percentage of free silicon-based domains is the percentage as determined by placing a sample of the composite powder in an alkaline solution for a specified time, determining the volume of hydrogen that has evolved after the specified time, calculating the amount of silicon needed for evolving this amount of hydrogen based on a production of two moles of hydrogen for every mole of silicon reacted and dividing this by the total amount of Si in metallic or oxidised state present in the sample.

4. The composite powder according to claim 1, wherein the powder contains less than 3 weight % of oxygen.

5. The composite powder according to claim 1, wherein the powder contains between 2 weight % and 25 weight % of Si.

6. The composite powder according to claim 1, wherein the matrix comprises pitch or thermally decomposed pitch.

7. The composite powder according to claim 1, wherein the silicon-based domains are silicon-based particles.

8. The composite powder according to claim 1, wherein the powder has an average particle diameter $d_{50}$ of between 1 and 20 microns.

9. The composite powder according to claim 1, wherein at least 97% of the surface area of the silicon-based domains is covered by the matrix.

10. The composite powder according to claim 1, wherein the silicon-based domains have a weight-based size distribution with a $d_{50}$ of 100 nm or less and a $d_{90}$ of 1000 nm or less.

11. The composite powder according to claim 1, wherein a ratio between an average size of the composite powder and a $d_{50}$ of the silicon-based domains is 10 or more.

* * * * *